United States Patent [19]
Krum et al.

[11] Patent Number: 5,490,627
[45] Date of Patent: Feb. 13, 1996

[54] DIRECT BONDING OF COPPER COMPOSITES TO CERAMICS

[75] Inventors: Alvin L. Krum, Huntington Beach; William T. Campbell, Costa Mesa, both of Calif.

[73] Assignee: Hughes Aircraft Company, Los Angeles, Calif.

[21] Appl. No.: 268,488

[22] Filed: Jun. 30, 1994

[51] Int. Cl.⁶ .................................................. B23K 31/00
[52] U.S. Cl. .................... 228/124.1; 228/198; 228/262.6
[58] Field of Search ................................. 228/124.1, 188, 228/198, 262.6, 262.2

[56] References Cited

U.S. PATENT DOCUMENTS

| | | | |
|---|---|---|---|
| 3,766,634 | 10/1973 | Babcock et al. | 228/188 |
| 4,505,418 | 3/1985 | Neidig et al. | 228/124.1 |
| 4,563,383 | 1/1986 | Kuneman et al. | 428/216 |
| 4,954,386 | 9/1990 | Mizunoya et al. | 228/124.1 |
| 5,176,309 | 1/1993 | Horiguchi et al. | 228/124.1 |

*Primary Examiner*—P. Austin Bradley
*Assistant Examiner*—Jeffrey T. Knapp
*Attorney, Agent, or Firm*—M. E. Lachman; M. W. Sales; W. K. Denson-Low

[57] ABSTRACT

A ceramic member (52) is direct-bonded to a copper composite substrate (58) by heating to diffuse copper to the surface (56) of the copper composite substrate, oxidizing the surface of the copper composite substrate following heating, placing a ceramic member in contact with the resulting oxidized substrate, and forming a copper-copper oxide eutectic (54) at the interface between the copper composite substrate and the ceramic member by heating. The eutectic, upon cooling, forms a bond between the copper composite and the ceramic.

10 Claims, 1 Drawing Sheet

DIRECT BONDING OF COPPER COMPOSITES TO CERAMICS

BACKGROUND OF THE INVENTION

1. Field of the Invention

The present invention relates to the bonding of copper composites to nonmetallic materials. In one of its more particular aspects this invention relates to the direct bonding of copper composites to ceramics.

2. Description of Related Art

In the design of electronic circuits, a principal consideration is the need to control temperature in order to improve reliability of the circuit components and to meet circuit performance requirements. In particular, in the case of power hybrids, which may have power densities exceeding 5 watts/in$^2$, it is essential to provide a heat sink, or heat spreader, such as a metal layer, to remove a considerable proportion of the heat generated in the power hybrid by the active and passive devices. Similar considerations are applicable to other microcircuits such as standard hybrids and multi-chip modules.

Copper layers have found wide use as heat sinks. Typically, they have been bonded to ceramic members by soldering or brazing. A disadvantage of such bonding techniques is that they introduce an additional thermal interface between the heat sink and ceramic member. Voids may also occur during the soldering or brazing process which adversely affects thermal conductivity.

U.S. Pat. No. 3,766,634, in an attempt to eliminate such interfaces and voids, describes the direct bonding of copper and other metals to nonmetallic substrates. A copper-copper oxide eutectic is used to bond copper to an alumina substrate, for example.

U.S. Pat. No. 4,563,383 describes a direct bond copper ceramic substrate for use in high temperature thick film processing. The substrate consists of two outer ceramic layers and a central copper core formed of three layers bonded by a copper oxygen eutectic to the outer ceramic layers. By bonding ceramic to both sides of the copper core, stress symmetry is said to be provided.

One problem encountered in the provision of direct bond metal ceramic structures is that there is a marked temperature coefficient of expansion mismatch between the metal and the ceramic. For example, pure copper has a coefficient of expansion of 16.8 ppm/°C. while alumina, beryllia and aluminum nitride, which are typical ceramic materials used in microcircuit packaging, have coefficients of expansion ranging from about 4.3 to 7.0 ppm/°C. Because of this mismatch, the thickness of the copper layer is severely limited. For example, with a 0.025-inch thick ceramic substrate, the thickness of the copper layer is limited to approximately 0.012 inch, because thicker copper layers would result in considerable warping of the resulting structures.

Thicker copper layers, however, are desirable to attach the copper ceramic material to a base structure, since the ceramic is too brittle to allow attachment by screwing down to the base structure.

In an effort to avoid the adverse effects of the mismatch of coefficients of expansion of metals and ceramics, approximately equal amounts of copper have been provided on both the top and bottom sides of the ceramic substrate to balance out the stresses. The thickness of such copper layers can be approximately one-tenth to one-third the substrate thickness. For example, with a 0.025 inch thick substrate, each copper layer might be approximately 0.008 inch thick, which is too thin to provide sufficient rigidity for attachment to a base structure. It would be desirable to provide heat sinks for hybrids and multi-chip modules having sufficient rigidity to allow screwing down the heat sink to a base structure. It would also be desirable to avoid the need for using amounts of the metal layers on both sides of the ceramic substrate.

Accordingly, it is an object of this invention to provide a heat sink directly bonded to a ceramic member, which heat sink is of sufficient rigidity to be readily attached by screwing down to a base structure.

Another object of this invention is to provide metal ceramic structures in which the metal and ceramic have similar temperature coefficients of expansion.

A further object of this invention is to provide a process for bonding together a heat sink and a ceramic member without requiring soldering or brazing.

Other objects and advantages of this invention will become apparent in the course of the following detailed disclosure and description.

SUMMARY OF THE INVENTION

The present invention utilizes a copper composite substrate which is directly bonded to a ceramic member. Standard copper composites cannot be directly bonded to ceramics as there is insufficient copper on the surface. In this invention, the copper composite substrate is subjected to a temperature sufficient to cause diffusion of copper to a region adjacent the surface of the composite. Oxidation of the diffused copper provides sufficient oxide to form a copper-copper oxide eutectic between the ceramic member and the copper composite upon heating. By placing a ceramic member in contact with the copper composite following oxidation and heating in an inert atmosphere, the copper-copper oxide eutectic which forms wets the surfaces of the oxidized copper composite and the ceramic so that, upon cooling, a strong bond is produced.

DESCRIPTION OF THE PREFERRED EMBODIMENTS

In order to overcome some of the deficiencies of the prior art, a copper composite, rather than pure copper, is used as the heat sink material. By using a copper composite having a coefficient of expansion close to that of the ceramic which partially overlies the heat sink, such as copper-tungsten or copper-molybdenum, it is possible to provide a relatively thick layer of copper composite which can be drilled and screwed down to a base structure. For example, a copper-tungsten composite which contains 75% tungsten and 25% copper has a coefficient of expansion of 6.0 ppm/°C., which is close to that of the ceramic. The coefficients of expansion of alumina, beryllia, and aluminum nitride, for example, fall in the range of 4.3 to 7.0 ppm/ C. Although the thermal conductivity is reduced from 401 watts/°C.-meter for pure copper to 287 watts/°C.-meter for a 75-25 mixture of tungsten and copper, the reduced thermal conductivity is sufficiently high for most heat sink applications.

Figure 1:
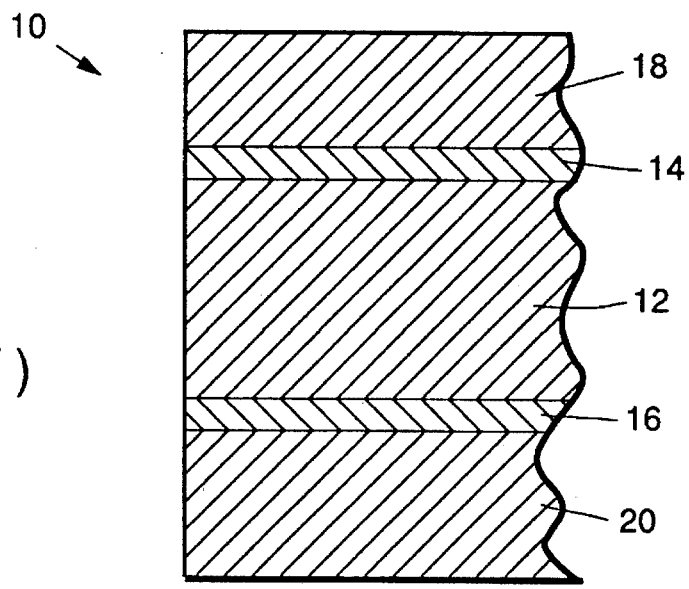
FIG. 1 is an enlarged diagrammatic cross-section of a copper-alumina structure according to the prior art which utilizes copper layers on either side of a single alumina layer.

A typical previously available copper ceramic structure is illustrated in FIG. 1 wherein the numeral 10 represents the overall structure, which consists of a layer of alumina 12 with copper-copper oxide eutectic layers 14 and 16 attached thereto. Attached to the eutectic layers are copper layers 18 and 20.

Figure 2:
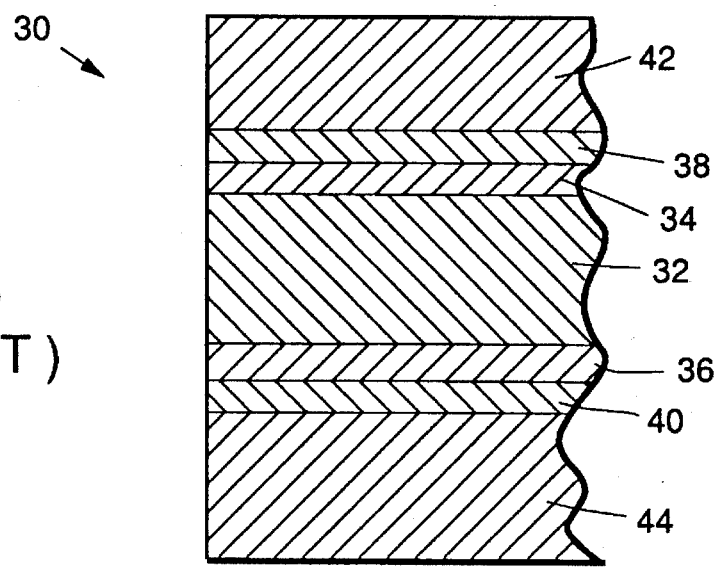
FIG. 2 is an enlarged diagrammatic cross-section of a copper-aluminum nitride structure according to the prior art which utilizes copper layers on either side of an aluminum nitride layer separated from the copper layer by aluminum oxide layers.

FIG. 2 illustrates a similar previously used structure in which the ceramic is aluminum nitride, which requires growing an intervening aluminum oxide layer to which are applied the eutectic and copper layers since aluminum nitride cannot be directly bonded to copper. In FIG. 2, numeral 30 represents the overall structure, which consists of aluminum nitride layer 32 sandwiched between aluminum oxide layers 34 and 36. Copper-copper oxide eutectic layers 38 and 40 are adjacent to aluminum oxide layers 34 and 36. The eutectic layers 38 and 40 separate the aluminum oxide layer from the copper layers 42 and 44. As shown in FIGS. 1 and 2, dual copper layers were previously used in order to prevent warping of the structure due to the mismatch in coefficients of expansion of the copper and alumina or aluminum nitride. The structure of the present invention differs from previously used structures in that a copper composite such as copper-tungsten is utilized as the heat sink in the present invention.

Figure 3:
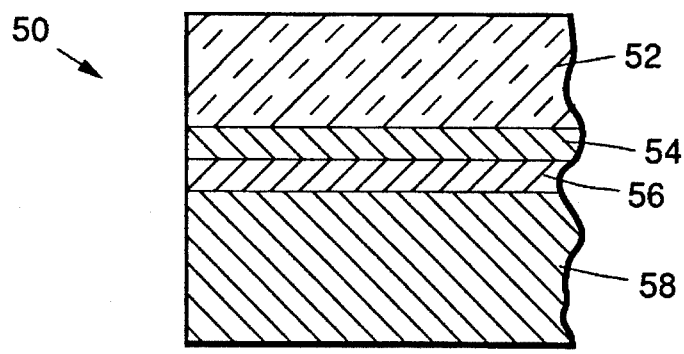
FIG. 3 is an enlarged diagrammatic cross-section of a copper-composite ceramic structure according to the present invention.

FIG. 3 illustrates the present invention, wherein the numeral 50 represents the overall structure with ceramic member 52 being adjacent copper-copper oxide eutectic layer 54, which in turn is adjacent to a diffused copper layer 56 which forms a part of copper-tungsten or other copper composite layer 58.

The copper-tungsten or other copper composite heat sink assembly of the present invention is readily produced by heating the copper-tungsten substrate of the desired thickness to a temperature at which copper diffuses into a region adjacent to the surface of the copper-tungsten substrate. A temperature of at least about 1200° C. has been found to be suitable for this purpose. The next step is oxidizing the diffused copper to produce copper oxide at the surface of the copper-tungsten substrate. The resulting oxidized substrate is next placed in contact with a ceramic member in an inert atmosphere and subjected to a temperature higher than the copper-copper oxide eutectic temperature and lower than the melting point of copper to produce a copper-copper oxide eutectic at the interface between the copper-tungsten substrate and the ceramic member. Temperatures in the range of about 1065° C. to 1083° C. have been found suitable for this step. The next step is cooling to solidify the eutectic and form a tenacious bond between the copper-tungsten and the ceramic. If necessary or desired, the resulting copper-tungsten heat sink assembly can be cleaned and plated to prevent further oxidation.

In addition to copper-tungsten composites which are commercially available in several different formulations such as 90/10, 85/15, 80/20 and 75/25, copper/tungsten from Polese Company, Inc. of San Diego, Calif.; Amitek of Pennsylvania; and Sumitomo of Japan; other copper composites can be used. As previously mentioned, copper-molybdenum composites can be similarly used.

Ceramics other than alumina, beryllia and aluminum nitride can also be used. For example, fused silica, titanates and spinels are satisfactory for this purpose.

The copper composite-ceramic bonds of the present invention are useful in a variety of semiconductor applications. For example, they may find use in the fabrication and assembly of hybrid circuits where a tenacious permanent bond is required. They may be used wherever it is required to provide a heat sink for an electronic device which utilizes a ceramic substrate.

Having thus described exemplary embodiments of the present invention, it will be understood by those skilled in the art that the within disclosure is exemplary only and that the present invention is not to be limited in scope except in accordance with the following claims.

What is claimed is:

1. A process for direct bonding a ceramic to a copper composite, said process comprising the steps of:

heating a copper composite substrate to a first temperature at which copper diffuses to a region adjacent the surface of said substrate, oxidizing said substrate after heating, placing a ceramic member in contact with the resulting oxidized substrate in an inert atmosphere at a second temperature sufficient to produce a copper-copper oxide eutectic at the interface between said oxidized substrate and said ceramic member, said eutectic, upon cooling, forming a bond between said ceramic and said copper composite.

2. The process of claim 1 wherein the copper composite is selected from the group consisting of copper-tungsten and copper-molybdenum.

3. The process of claim 1 wherein the ceramic is selected from the group consisting of alumina, beryllia, and aluminum nitride.

4. The process of claim 1 wherein the copper composite is copper-tungsten and said first temperature is above about 1200° C.

5. The process of claim 1 wherein said second temperature is higher than the copper-copper oxide eutectic formation temperature and lower than the melting point of copper.

6. The process of claim 1 wherein said second temperature is within the range of about 1065° C. to 1083° C.

7. The process of claim 1 wherein the oxidizing step comprises reacting the diffused copper with an oxidizing agent.

8. The process of claim 7 wherein said oxidizing agent comprises oxygen.

9. A process for direct bonding a ceramic member to a copper-tungsten substrate, said process comprising the steps of:

heating a copper-tungsten substrate to a temperature of about 1200° C., oxidizing said substrate after heating, placing a ceramic member in contact with the resulting oxidized copper-tungsten substrate in an inert atmosphere at a temperature in the range of about 1065° C. to 1083° C. to produce a copper-copper oxide eutectic at the interface between said oxidized copper-tungsten substrate and said ceramic member, cooling to form a bond between said ceramic member and said copper-tungsten substrate.

10. The process of claim 9 wherein said ceramic is selected from the group consisting of alumina, beryllia, and aluminum nitride.

* * * * *